US008633446B2

(12) United States Patent
Jung

(10) Patent No.: US 8,633,446 B2
(45) Date of Patent: Jan. 21, 2014

(54) X-RAY DETECTOR AND X-RAY IMAGE DETECTING METHOD

(75) Inventor: Kwan-Wook Jung, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 287 days.

(21) Appl. No.: 13/067,545

(22) Filed: Jun. 8, 2011

(65) Prior Publication Data

US 2011/0303853 A1 Dec. 15, 2011

(30) Foreign Application Priority Data

Jun. 9, 2010 (KR) ........................ 10-2010-0054503

(51) Int. Cl.
*G01T 1/24* (2006.01)
(52) U.S. Cl.
USPC .................................. 250/370.09
(58) Field of Classification Search
USPC .................................. 250/370.09
See application file for complete search history.

(56) References Cited

U.S. PATENT DOCUMENTS

| 6,115,451 | A | 9/2000 | Boundry et al. |
| 6,621,887 | B2 * | 9/2003 | Albagli et al. ................. 378/42 |
| 7,382,859 | B2 * | 6/2008 | Nokita et al. ................ 378/98.8 |
| 7,492,865 | B2 | 2/2009 | Hahm et al. |
| 2009/0245465 | A1 | 10/2009 | Jung et al. |
| 2010/0020933 | A1 | 1/2010 | Topfer et al. |

FOREIGN PATENT DOCUMENTS

| JP | 2005-283422 A | 10/2005 |
| JP | 2006-334085 A | 12/2006 |
| KR | 10-2004-0087418 A | 10/2004 |
| KR | 10-2009-0102185 A | 9/2009 |
| KR | 10-2010-0011954 A | 2/2010 |

* cited by examiner

*Primary Examiner* — Constantine Hannaher
(74) *Attorney, Agent, or Firm* — Lee & Morse, P.C.

(57) ABSTRACT

An X-ray detector and a method of detecting an X-ray image. The method includes: during an offset adjustment, sequentially outputting first gate signals to a plurality of gate lines for turning on the switching devices; during an offset read out, sequentially outputting second gate signals to the plurality of gate lines for turning on the switching devices after a first window time; and during the offset read out, reading electrical signals output by the switching device.

16 Claims, 6 Drawing Sheets

FIG. 5A

| GATE SCAN 1 | GATE SCAN 2 | ... | GATE SCAN N | X-RAY WINDOW TIME | READ OUT |

FIG. 5B

| GATE SCAN 1 | GATE SCAN 2 | ... | GATE SCAN N | OFFSET WINDOW TIME | READ OUT 1 |

| GATE SCAN 1 | GATE SCAN 2 | ... | GATE SCAN N | OFFSET WINDOW TIME | READ OUT N |

X-RAY DETECTOR AND X-RAY IMAGE DETECTING METHOD

CROSS-REFERENCE TO RELATED APPLICATION

This application claims the benefit of Korean Patent Application No. 10-2010-0054503, filed on Jun. 9, 2010 in the Korean Intellectual Property Office, the disclosure of which is incorporated herein in its entirety by reference.

BACKGROUND

1. Field

An aspect of the present invention relates to an X-ray detector and a method of detecting an X-ray image.

2. Description of the Related Art

In general, X-rays have a short wavelength and may easily penetrate through a subject. Amounts of penetrating X-rays are affected by the density of an area of the subject. That is, an area of the subject may be indirectly observed due to the amounts of X-rays penetrating the subject.

X-ray detectors detect the amounts of X-rays penetrating the subject. The X-ray detectors detect the amounts of penetrated X-rays and may display a form of an area of the subject on a display device. X-ray detectors may be generally used in examination apparatuses such as a medical examination apparatus, an inspection apparatus, etc. Currently, a flat panel digital radiography (DR) method, which uses DR and does not use a film, is widely used as an X-ray detector.

The flat panel X-ray detector using the flat panel DR method obtains an image on the basis of an electrical signal corresponding to incident radiography. The obtained image is shown to be different from an actual image because device offset values of the X-ray detector are different from each other. The device offset values may continuously change according to the environment in which the device is used. Accordingly, offset correction is required in order to remove non-uniformity of an image, and an accurate offset value is required to be obtained for offset correction.

SUMMARY

An aspect of the present invention provides an X-ray detector obtaining an accurate offset image and capable of improving the quality of an X-ray image, and a method of detecting an X-ray image.

According to an aspect of the present invention, there is provided a method of detecting an X-ray image using an X-ray detector including an array of light sensing pixels each including a switching device, the method including: during an offset adjustment, sequentially outputting first gate signals to turn on the switching devices to a plurality of gate lines; during an offset read out, sequentially outputting second gate signals to turn on the switching devices to the plurality of gate lines after a first window time; and during the offset read out, reading out electrical signals output by the switching devices.

According to another aspect of the present invention, the outputting of the first gate signals may be repeated at least twice.

According to another aspect of the present invention, the X-ray detector may discharge electrical signals of data lines during the offset adjustment.

According to another aspect of the present invention, the method may further include obtaining an offset image on the basis of the read out electrical signals.

According to another aspect of the present invention, the method may further include updating the obtained offset image by averaging the obtained offset image and a previously obtained offset image.

According to another aspect of the present invention, the method may further include during an X-ray read out, sequentially outputting fourth gate signals to turn on the switching devices to the plurality of gate lines after a second window corresponding to an X-ray radiation time; and during the X-ray read out, reading out electrical signals output by the switching devices.

According to another aspect of the present invention, the method may further include obtaining an X-ray image on the basis of the electrical signals read during the X-ray read out.

According to another aspect of the present invention, the method may further include subtracting an offset image obtained before the X-ray radiation from the X-ray image.

According to another aspect of the present invention, the method may further include initializing electrical signals of the light sensing pixels during a signal initialization between the offset read out and the X-ray read out.

According to another aspect of the present invention, there is provided an X-ray detector including: a plurality of light sensing pixels including a photo diode to sense X-rays and to output an electrical signal corresponding to an amount of penetrated X-rays and a switching device to transmit the electrical signal; a gate driver to output a first gate signal to turn on the switching device during an offset adjustment and a second gate signal to turn on the switching device during an offset read out to a gate line after a first window time; and a read out integrated circuit to read out the electrical signal output by the switching device during the offset read out.

According to another aspect of the present invention, the first gate signal may be repeatedly output at least twice.

According to another aspect of the present invention, the read out integrated circuit may discharge an electrical signal of a data line during the offset adjustment.

According to another aspect of the present invention, the X-ray detector may further include a signal processor to obtain an offset image on the basis of the read out electrical signal.

According to another aspect of the present invention, the signal processor may update the obtained offset image by averaging the obtained offset image and a previously obtained offset image.

According to another aspect of the present invention, the gate driver may output a fourth gate signal to turn on the switching device to the gate line after a second window time corresponding to an X-ray radiation time, during an X-ray read out, and wherein the read out integrated circuit reads out an electrical signal output by the switching device during the X-ray read out.

According to another aspect of the present invention, the X-ray detector may further include a signal processor to obtain an offset image on the basis of the electrical signal read out during the offset read out, wherein the signal processor obtains an X-ray image on the basis of the electrical signal read out during the X-ray read out.

According to another aspect of the present invention, the signal processor may subtract the offset image obtained before the X-ray radiation from the X-ray image.

According to another aspect of the present invention, the read out integrated circuit may initialize an electrical signal of the light sensing pixel during a signal initialization between the offset read out and the X-ray read out.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A and 5B illustrate driving sequences for generating an X-ray image and an offset image, respectively, according to an embodiment of the present invention;

DETAILED DESCRIPTION

Figure 1:
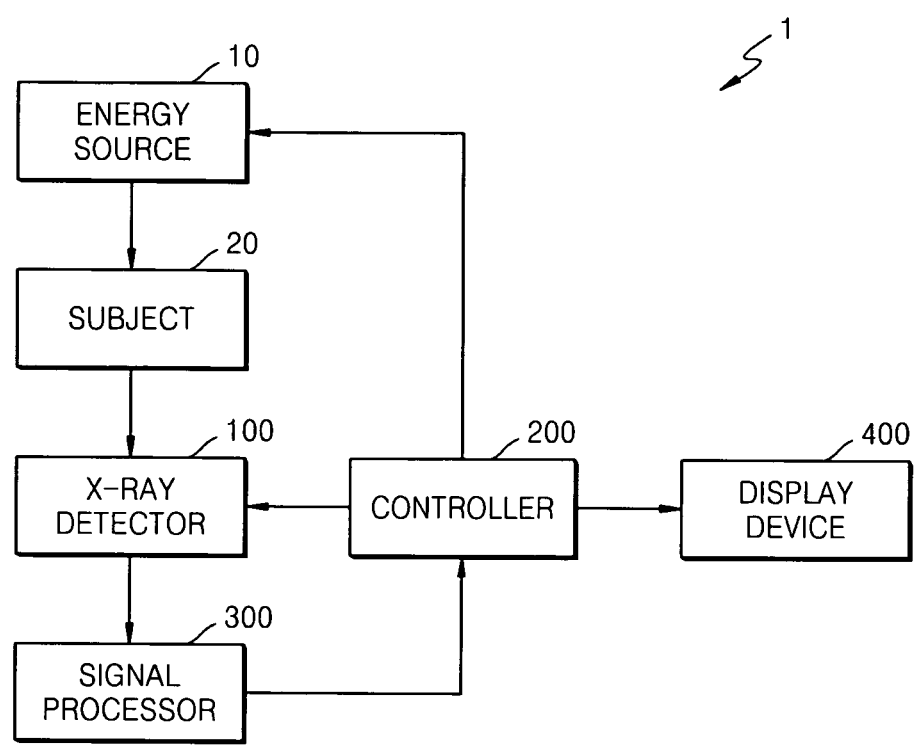
FIG. 1 is a schematic block diagram illustrating an X-ray detecting system, according to an embodiment of the present invention.

Hereinafter, exemplary embodiments of the present invention will be described in detail with reference to the attached drawings. Like reference numerals designate like elements throughout the specification. In the description, the detailed descriptions of well-known functions and structures may be omitted so as not to hinder the understanding of the aspects of the present invention. In the drawings, the width and thicknesses of layers and regions are exaggerated for clarity of the specification.

FIG. 1 is a schematic block diagram illustrating an X-ray detecting system 1, according to an embodiment of the present invention. Referring to FIG. 1, the X-ray detecting system 1 includes an energy source 10, an X-ray detector 100, a controller 200, a signal processor 300, and a display device 400.

The energy source 10 is a device for sending radiation such as X-rays toward an object or subject 20. The X-ray detector 100 includes a plurality of light sensing pixels for sensing X-rays in a flat panel. The X-ray detector 100 includes a plurality of photo diodes and a plurality of switching devices that may detect X-rays penetrating the object or subject 20. If X-rays are detected by the photo diodes when a reverse bias is applied to the photo diodes, an electrical signal corresponding to an amount of detected X-rays is generated in each photo diode. The electrical signals are output via data lines and are then provided to a read out integrated circuit.

The X-ray detector 100 performs an offset read out for obtaining an offset image when X-rays are not emitted and performs an X-ray read out for obtaining an X-ray image when X-rays are emitted from the energy source 10. In addition, the X-ray detector 100 performs offset adjustment by performing gate scanning before performing the offset read out and performs signal initialization by performing gate scanning before performing the X-ray read out. When the X-ray detector 100 performs offset adjustment, gate scanning is performed at least twice.

The controller 200 controls operations of the energy source 10, the X-ray detector 100, and the display device 400 to form an offset-corrected X-ray image. The controller 200 controls when and how long the energy source 10 radiates X-rays. The controller 200 controls driving sequences for obtaining an offset image of the X-ray detector 100 and for obtaining an X-ray image. While not required in all aspects, it is understood that the controller 200 can be implemented using a general or special purpose computer executing computer software and/or firmware encoded on one or more computer readable media.

The signal processor 300 converts the electrical signals output from the X-ray detector 100 into a digital signal. The signal processor 300 generates an offset image and an X-ray image from the digital signal. The current offset image is updated by averaging a previously generated offset image and the current offset image. The signal processor 300 generates an offset-corrected X-ray image by subtracting the offset image, which is generated before X-rays are radiated, from the X-ray image. While not required, the offset image can be stored in a memory incorporated in the processor 300, controller 200 or connected to the processor 300.

The display device 400 displays the offset-corrected X-ray image. The display device 400 may be a liquid crystal display (LCD), an organic light-emitting display device, or a plasma display panel. However, aspects of the present invention are not limited to these types of display devices and other display devices may be used.

Figure 2:
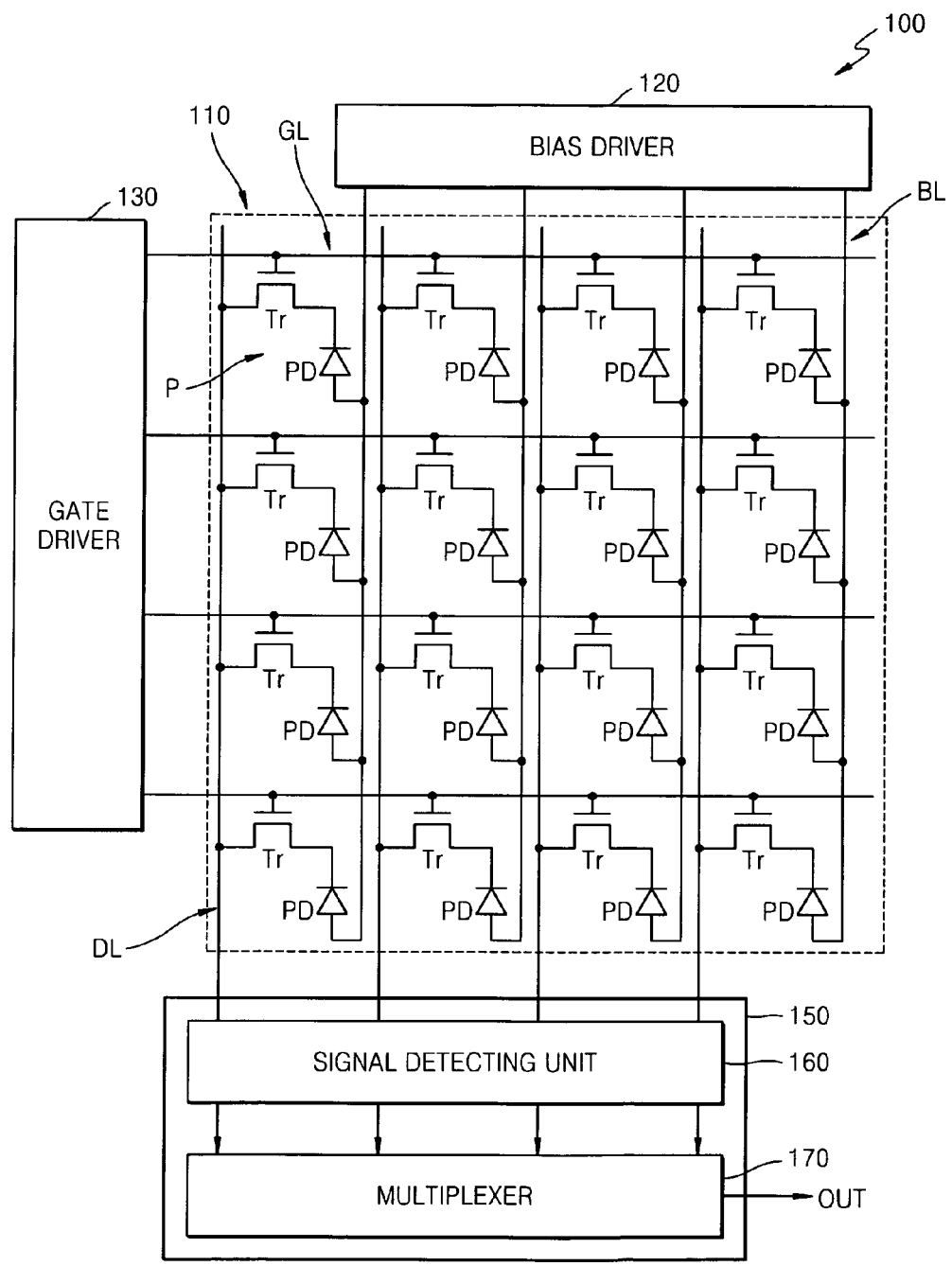
FIG. 2 is a schematic circuit diagram illustrating an X-ray detector, according to an embodiment of the present invention.
Figure 3:
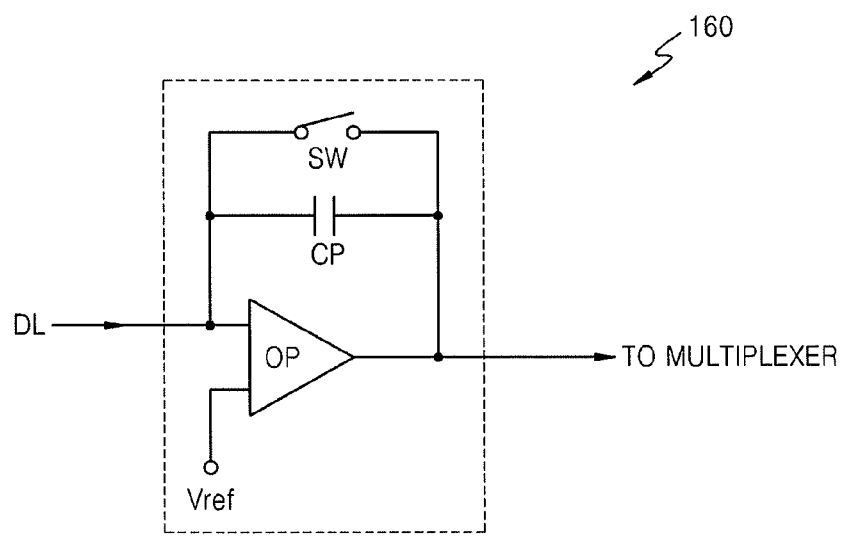
FIG. 3 is a schematic circuit diagram illustrating a configuration of a signal detecting unit of FIG. 2 according to an aspect of the invention.

FIG. 2 is a schematic circuit diagram illustrating the X-ray detector 100, according to an embodiment of the present invention. FIG. 3 is a schematic circuit diagram illustrating a configuration of a signal detecting unit 160 of FIG. 2, according to an aspect of the invention.

Referring to FIG. 2, the X-ray detector 100 includes a panel 110, a bias driver 120, a gate driver 130, and a read out integrated circuit 150. The panel 110 senses X-rays radiated from the energy source 10, performs photoelectric conversion on the sensed signals, and outputs the resultant signals as electrical signals. The panel 110 includes a plurality of light sensing pixels P arranged in a matrix form and connected to a plurality of gate lines GL and a plurality of data lines DL. The plurality of gate lines GL and the plurality of data lines DL may cross each other at right angles as shown, but the invention is not limited thereto. FIG. 2 illustrates sixteen light sensing pixels P arranged in four columns and four rows, but the aspects of the present invention are not limited thereto, and the panel 110 may include more or less light sensing pixels P.

Each of the plurality of sensing pixels P includes a photo diode PD and a transistor Tr. The photo diode PD senses X-rays and outputs an electrical signal, such as a light detecting voltage. The transistor Tr switches an electrical signal output from the photo diode PD.

Each of the photo diodes PD senses X-rays radiated from the energy source 10, generates a signal and outputs the sensed signals as electrical signals. The photo diodes PD may be PIN diodes and include first and second electrodes. The first electrodes of the photo diodes PD may be electrically connected to drain electrodes of the transistors Tr. The second electrodes of the photo diodes PD may be electrically connected to a plurality of bias lines BL to which a bias voltage is applied.

The transistors Tr are switching devices for switching the electrical signals output from the photo diodes PD. Gate electrodes of the transistors Tr may be electrically connected to the gate lines GL of the gate driver 130, and source electrodes of the transistors Tr may be electrically connected to the read out integrated circuit 150 via the data lines DL.

The bias driver 120 applies a driving voltage to each of the plurality of bias lines BL. The bias driver 120 may selectively apply a reverse bias or a forward bias to the photo diodes PD.

The gate driver 130 sequentially applies gate signals to the plurality of gate lines GL. When a gate signal is applied to one gate line GL, a corresponding transistor Tr is turned on. In contrast, when the gate signal is not applied to the one gate line GL, the corresponding transistor Tr is turned off.

When one transistor Tr is turned on, an electrical signal applied from a corresponding photo diode PD is output through the source electrode of the transistor Tr. The electrical signal output from the source electrode is output to the read out integrated circuit 150 via the data line DL. The gate driver 130 is formed in an IC form and may be mounted on a side of the panel 110 or may be directly formed through a thin-film process.

The gate driver 130 sequentially outputs first gate signals to the plurality of gate lines GL for turning on the transistors Tr when performing offset adjustment and outputs second gate signals to the plurality of gate lines GL for turning on the transistors Tr when performing a subsequent offset read out. The second gate signals are output after a first offset window time in which X-rays are not radiated.

The gate driver 130 sequentially outputs third gate signals to the plurality of gate lines GL for turning on the transistors Tr when performing signal initialization. The gate driver 130 sequentially outputs fourth gate signals to the plurality of gate lines GL for turning on the transistors Tr when performing an X-ray read out. The fourth gate signals are output after a second window time in which X-rays are radiated.

The read out integrated circuit 150 detects the electrical signals output from the transistors Tr turned on in response to gate signals. The read out integrated circuit 150 detects the electrical signals output from the transistors Tr during the offset read out and during the X-ray read out.

The read out integrated circuit 150 includes a signal detecting unit 160 and a multiplexer 170. The signal detecting unit 160 includes a plurality of amplifying units respectively corresponding to the plurality of data lines DL. Each of the amplifying units includes an amplifier OP, a capacitor CP, and a reset device SW.

Referring to FIG. 3, the amplifier OP includes a first input terminal, a second terminal and an output terminal. The first terminal is connected to the corresponding data line DL. The second input terminal receives a reference voltage Vref. The reference voltage Vref may be a ground voltage OV. The first input terminal may be a minus terminal of the amplifier OP, and the second input terminal may be a plus terminal of the amplifier OP. The output terminal is connected to the multiplexer 170.

One end of the capacitor CP is electrically connected to the first input terminal of the amplifier OP, and another end of the capacitor CP is electrically connected to the output terminal of the amplifier OP.

The reset device SW resets the capacitor CP by discharging a voltage charged in the capacitor CP. The reset device SW is connected to the capacitor CP in parallel. One end of the reset device SW is electrically connected to the one end of the capacitor CP, and another end of the reset device SW is electrically connected to the other end of the capacitor CP. The reset device SW may include a switch capable of electrically connecting both ends of the capacitor CP to each other. When the switch of the reset device SW is turned on, both ends of the capacitor CP are electrically connected to each other, and a voltage charged in the capacitor CP is discharged. The switch of the reset device SW is turned on when performing gate scanning for offset adjustment and when performing gate scanning for signal initialization and discharges an electrical signal of the data line DL connected to the first input terminal of the amplifier OP.

The multiplexer 170 receives voltage signals from the amplifiers OP of the signal detecting unit 160 and sequentially outputs the voltage signals to the signal processor 300. The multiplexer 170 may include switches corresponding to the amplifiers OP.

The voltage signals output from the multiplexer 170 are input to the signal processor 300. The signal processor 300 includes a control circuit (not shown) for converting the voltage signals into an image signal and transmits the generated image signal to the display device 400 via the controller 200. Thus, an image captured by the X-ray detector 100 may be displayed on the display device 400.

Figure 4:
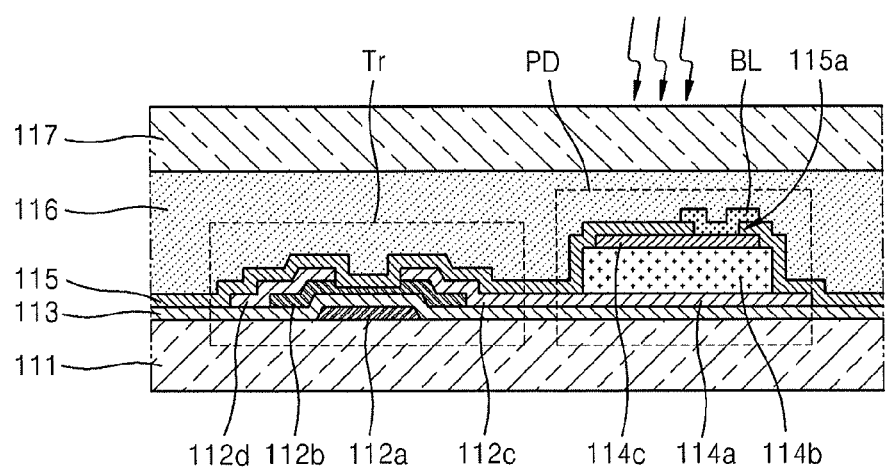
FIG. 4 is a cross-sectional view illustrating a unit light sensing pixel of FIG. 2 according to an aspect of the invention.

FIG. 4 is a cross-sectional view illustrating one unit light sensing pixel P of FIG. 2 according to an aspect of the invention. Referring to FIG. 4, the unit light sensing pixel P includes one transistor Tr and one photo diode PD formed on a base substrate 111. The transistor Tr may include a gate electrode 112a, an active pattern 112b, a source electrode 112d, and a drain electrode 112c. The photo diode PD may include a first electrode 114a, a photo conductive layer 114b, and a second electrode 114c.

The base substrate 111 may have a plate shape. The base substrate 111 may be formed of a transparent material, for example, glass, quartz, or a synthetic resin.

The gate electrode 112a of the transistor Tr is formed on the base substrate 111. The gate electrode 112a may be formed to protrude from the gate line GL and formed of a same material as that of the gate line GL, for example, aluminum (Al) or an Al alloy.

The gate electrode 112a is covered by a gate insulating layer 113 that may be formed of silicon nitride (SiNx) or silicon oxide (SiOx).

The active pattern 112b of the transistor Tr is formed on the gate insulating layer 113. The active pattern 112b may include a channel layer formed on the gate insulating layer 113 and an ohmic contact layer formed on the channel layer. The channel layer may include amorphous silicon (a-Si), and the ohmic contact layer may include amorphous silicon (n+ a-Si) doped with high density ions.

The source electrode 112d and the drain electrode 112c of the transistor Tr are formed on the active pattern 112b and are spaced apart from each other at a predetermined interval. The source electrode 112d and the drain electrode 112c may be formed of a same material as that of the data line DL, for example, molybdenum (Mo), a molybdenum-tungsten alloy (MoW), chromium (Cr), tantalum (Ta), titanium (Ti), or the like.

The first electrode 114a of the photo diode PD and the drain electrode 112c of the transistor Tr are formed as one body on the gate insulating layer 113 so as to be electrically connected to each other. The photo conductive layer 114b is formed on the first electrode 114a. Although not shown in FIG. 4, the photo conductive layer 114b may have a structure in which an n-type silicon layer, an intrinsic silicon layer, and a p-type silicon layer are sequentially stacked.

The second electrode 114c of the photo diode PD is disposed opposite to the first electrode 114a on the photo conductive layer 114b. The second electrode 114c may be formed of a transparent material, for example, indium tin oxide (ITO), so that X-rays may be transmitted into the photo conductive layer 114b.

A passivation layer 115 is formed over all of the base substrate 111 so as to cover the photo diode PD and the transistor Tr. The passivation layer 115 may be formed of SiNx or SiOx.

A contact hole 115a for exposing the second electrode 114c of the photo diode PD is formed in the passivation layer 115. A bias line BL may be electrically connected to the second electrode 114c of the photo diode PD through the contact hole 115a.

An insulating layer 116 is further formed over all of the base substrate 111 so as to cover the passivation layer 115 and the bias line BL, thus forming the panel 110.

A scintillator 117 is formed on the panel 110, [that is, on the insulating layer 116]. The scintillator 117 changes X-rays passing through the subject 20 from the energy source 10 and incident thereon into green light having a visible ray wavelength of 550 nm and emits the green light toward the panel 110. The scintillator 117 may be formed of cesium iodide.

FIGS. 5A and 5B illustrate driving sequences for generating an X-ray image and an offset image, respectively, according to an embodiment of the present invention. FIG. 5A is a driving sequence that is applied to the X-ray detector 100 in order to obtain an X-ray image. Referring to FIG. 5A, the X-ray detector 100 performs gate scanning a predetermined number of times, is then exposed to X-rays radiated during an X-ray window time, and detects or reads out electrical signals generated in the photo diodes PD of the X-ray detector 100 when the X-ray radiation is finished.

The X-ray detector 100 performs gate scanning for signal initialization a predetermined number of times before the X-ray window time, which is an X-ray radiation duration.

Gate signals are applied to each gate line GL starting from a first gate line GL to a last gate line GL so as to turn on the transistors Tr of the light sensing pixels P. When the turned-on transistors Tr are turned off, electrical signals of the data lines DL are discharged.

The X-ray detector 100 is exposed to X-rays during the X-ray window time. Each photo diode PD generates an electrical signal corresponding to an amount of penetrated X-rays.

When the X-ray radiation is finished, the X-ray detector 100 transmits gate signals to the gate lines GL so as to turn on the transistors Tr of the light sensing pixels P. The X-ray detector 100 reads out the electrical signals generated in the photo diodes PD through the data lines DL connected to the turned-on transistors Tr as read-out electrical signals. An X-ray image is obtained by the read-out electrical signals.

FIG. 5B is a driving sequence that is applied to the X-ray detector 100 in order to obtain an offset image. The offset image is generated during an idling state during which X-rays are not radiated. Referring to FIG. 5B, the X-ray detector 100 performs gate scanning a predetermined number of times, is kept in an idling state during an offset window time, and then performs an offset read out.

The X-ray detector 100 performs gate scanning a predetermined number of times in order to implement offset adjustment, corresponding to the gate scanning in FIG. 5A, before the offset window time. The number of times the gate scanning for signal initialization is performed in one frame of FIG. 5A and the number of times the gate scanning for offset adjustment is performed in one frame of FIG. 5B may be different.

Gate signals are applied to each gate line GL starting from the first gate line GL to the last gate line GL so as to turn on the transistors Tr of the light sensing pixels P. When the turned-on transistors Tr are turned off, electrical signals of the data lines DL are discharged.

The X-ray detector 100 is kept in an idling state during the offset window time, which corresponds to the X-ray radiation duration of FIG. 5A.

After the offset window time, the X-ray detector 100 applies gate signals to the gate lines GL so as to turn on the transistors Tr of the light sensing pixels P. The X-ray detector 100 reads out the electrical signals of the data lines DL connected to the turned-on transistors Tr as read-out electrical signals. The read-out electrical signals may be leaked signals when the transistors Tr are turned off. An offset image may be obtained by the read-out electrical signals.

The offset image is repeatedly generated N times during the idle state. The newly generated offset image and a previously generated offset image are averaged, and thus the offset image may be updated.

Figure 6:
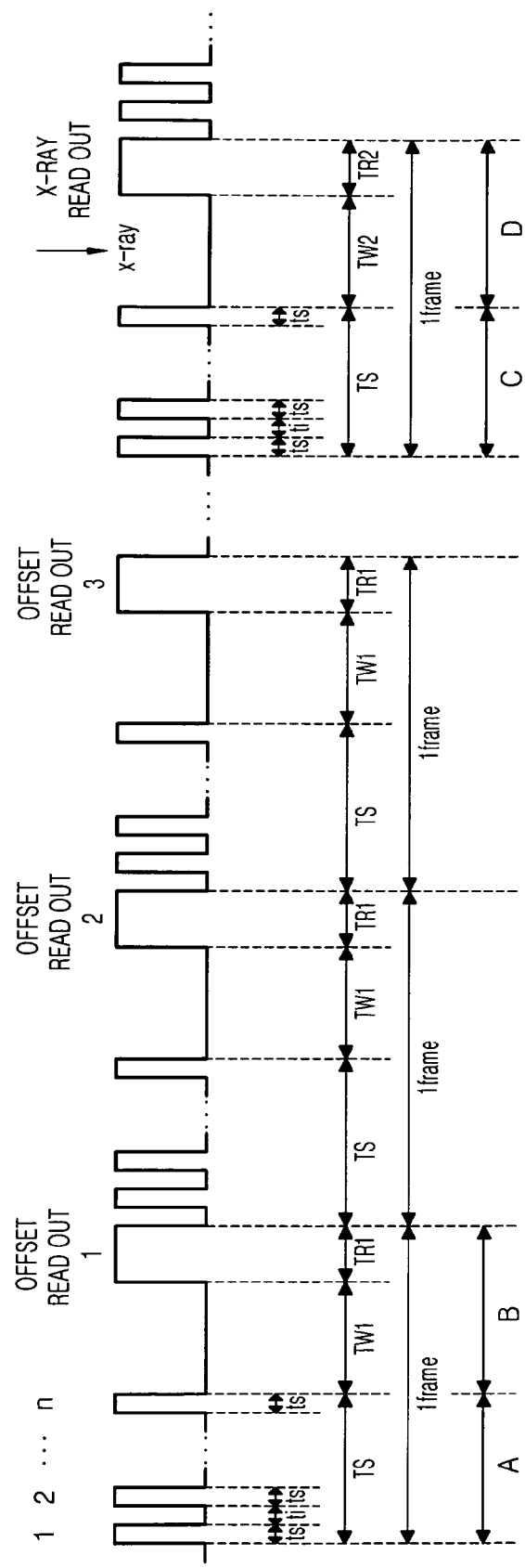
FIG. 6 is a timing diagram for describing a method of generating an offset image and an X-ray image, according to an embodiment of the present invention.

FIG. 6 is a timing diagram for describing a method of generating an offset image and an X-ray image, according to an embodiment of the present invention. Referring to FIG. 6, the X-ray detector 100 obtains an offset image by performing a read out without performing X-ray radiation, and obtains an X-ray image by performing a read out after performing X-ray radiation.

A driving period for obtaining an offset image of one frame includes an offset adjustment duration A and an offset read out duration B. In the offset adjustment duration A, the X-ray detector 100 performs gate scanning n times, where n is at least 2. A gate scan time ts is a time in which the first gate signals are applied to each gate line GL starting from the first gate line GL to the last gate line GL so as to perform gate scanning. A gate scan duration ti may be 0. Gate scanning is performed n times within a total gate scan time TS.

In detail, the first gate signals are sequentially applied from the gate driver 130 to the plurality of gate lines GL, and the transistors Tr are turned on by each first gate signal. Then, the turned-on transistors Tr are turned off. At this time, the reset devices SW of the signal detecting unit 160 are in a closed state and are electrically connected to both ends of the capacitors CP of the signal detecting unit 160. Electrical signals of the data lines DL are discharged by the reset devices SW. Gate scanning is continuously performed a plurality of times, and then discharging may be performed once. When gate scanning is finished, the reset devices SW may be in an opened state.

In the offset read out duration B, the X-ray detector 100 is kept idling during an offset window time TW1. At this time, the transistors Tr are in a turned-off state.

After the offset window time TW1, the X-ray detector 100 performs an offset read out to read an electrical signal via the transistor Tr of each of the light sensing pixels P in a period TR1.

In detail, the second gate signals are sequentially applied from the gate driver 130 to the plurality of gate lines GL. The transistors Tr of the light sensing pixels P are turned on by the second gate signals. The electrical signals output by the turned-on transistors Tr are read by the data lines DL and are transmitted to the read out integrated circuit 150.

The signal processor 300 obtains an offset image based on the electrical signals output from the read out integrated circuit 150 and updates the obtained offset image by averaging the obtained offset image and a previously obtained offset image. As shown, the average could be the offset image reads out 3 and 2, or of all readout images 1 through 3.

A driving duration for obtaining an X-ray image of one frame includes a signal initialization duration C and an X-ray read out duration D. In the signal initialization duration C, the X-ray detector 100 performs gate scanning n times, where n is at least 2. A gate scan time ts is a time in which the third gate signals are applied to each gate line GL starting from the first gate line GL to the last gate line GL so as to perform gate scanning. A gate scan duration may be 0. Gate scanning is performed n times within a total gate scan time TS.

The third gate signals are sequentially applied from the gate driver 130 to the plurality of gate lines GL, and the transistors Tr are turned on by each third gate signal. Then, the turned-on transistors Tr are turned off. At this time, the reset devices SW of the signal detecting unit 160 are in a closed state and are electrically connected to both ends of the capacitors CP of the signal detecting unit 160. Electrical signals of the data lines DL are discharged by the reset devices SW. In this regard, gate scanning is continuously performed a plurality of times, and then discharging may be performed once. When gate scanning is finished, the reset devices SW may be in an opened state.

In the X-ray read out duration D, the X-ray detector 100 is exposed to X-rays during an X-ray window time TW2. At this time, the transistors Tr are in a turned-off state.

After the X-ray window time TW2, the X-ray detector 100 performs an X-ray read out to detect an electrical signal via the transistor Tr of each of the light sensing pixels P in a period TR2. In detail, the fourth gate signals are sequentially applied from the gate driver 130 to the plurality of gate lines GL. The transistors Tr of the light sensing pixels P are turned on by the fourth gate signals. The electrical signals formed in the photo diodes PD during the X-ray window time TW2 are transmitted through the turned-on transistors Tr. The electrical signals output by the turned-on transistors Tr are detected by the data lines DL and are transmitted to the read out integrated circuit 150.

The signal processor 300 obtains an X-ray image based on the electrical signals output from the read out integrated circuit 150. The signal processor 300 subtracts the updated offset image from the X-ray image and thus generates an offset-corrected X-ray image.

Figure 7:
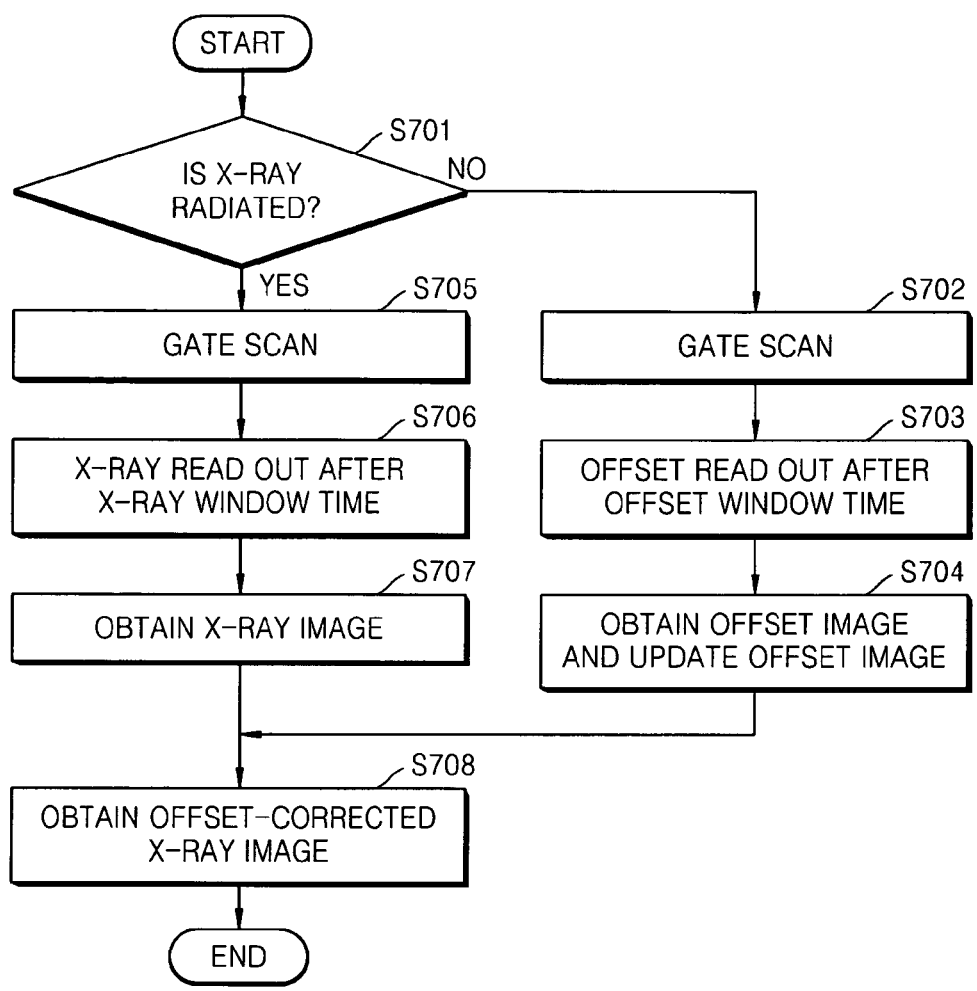
FIG. 7 is a schematic flowchart illustrating a method of obtaining an X-ray image that is offset-corrected in an X-ray detecting system, according to an embodiment of the present invention.

FIG. 7 is a schematic flowchart illustrating a method of obtaining an X-ray image that is offset-corrected in an X-ray detecting system, according to an embodiment of the present invention. Referring to FIG. 7, the X-ray detector 100 determines whether X-rays are radiated or not (S701). When X-rays are not radiated, in an offset adjustment duration, the X-ray detector 100 performs gate scanning at least twice (S702). The gate driver 130 sequentially outputs the first gate signals to the gate lines GL to turn on the transistors Tr. The transistors Tr turned on by the first gate signals are then turned off, and electrical signals of the data lines DL are discharged.

Next, in an offset read out duration, the X-ray detector 100 performs an offset read out after an offset window time (S703). The gate driver 130 sequentially outputs the second gate signals to the gate lines GL. Electrical signals output by the transistors Tr turned on by the second gate signals are read out.

The signal processor 300 obtains an offset image based on the electrical signals detected in the offset read out duration and updates the obtained offset image by averaging the obtained offset image and a previously obtained offset image (S704).

When X-rays are radiated (S701), in a signal initialization duration, the X-ray detector 100 performs gate scanning at least twice (S705). The gate driver 130 sequentially outputs the third gate signals to the gate lines GL to turn on the transistors Tr. The transistors Tr turned on by the third gate signals are then turned off, and electrical signals of the data lines are discharged.

Next, in an X-ray read out duration, the X-ray detector 100 is exposed to X-rays during an X-ray window time and then the X-ray detector 100 performs X-ray read out (S706). The gate driver 130 sequentially outputs the fourth gate signals to the gate lines GL to turn on the transistors Tr, and the electrical signals output by the transistors Tr are read out.

The signal processor 300 obtains an X-ray image based on the electrical signals detected in the X-ray read out duration (S707).

The signal processor 300 obtains an offset-corrected X-ray image by subtracting the updated offset image from the X-ray image (S708).

According to an aspect of the present invention, gate scanning is repeatedly performed a predetermined number of times before an offset window time (delay time) in order to obtain an accurate offset image. Thus, an offset value of each light sensing pixel may be further accurately measured. In addition, a plurality of offset images are obtained, and an average value thereof is used, and thus a more accurate offset image can be obtained.

An X-ray detector according to an aspect of the present invention can obtain an accurate offset image, and thus can improve the quality of an X-ray image.

While the aspects of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of obtaining an X-ray image using an X-ray detector comprising an array of light sensing pixels each light sensing pixel including a switching device, the method comprising:
   (a) during an offset adjustment period of a first frame, performing a gate scan operation a predetermined number of times, wherein the predetermined number is at least two and wherein each gate scan operation includes sequentially outputting first gate signals to a plurality of gate lines to turn on the switching devices of the light sensing pixels;
   (b) during an offset read out of the first frame, sequentially outputting second gate signals to the plurality of gate lines to turn on the switching devices of the light sensing pixels after a first window time, and reading electrical signals output by the switching devices;
   (c) generating a first offset image based on the electrical signals in (b);
   (d) repeating (a)-(c) for a second frame to generate a second offset image;
   (e) generating a third offset image based on the first offset image and the second offset image; and
   (f) correcting an X-ray image detected after the second frame based on the third offset image, wherein (f) includes subtracting the third offset image from the X-ray image.

2. The method of claim 1, wherein the X-ray detector detects discharged electrical signals from data lines during the offset adjustment period.

3. The method of claim 1, wherein (e) includes generating the third offset image by averaging the first and second offset images.

4. The method of claim 1, further comprising:
during an X-ray read out, sequentially outputting fourth gate signals to the plurality of gate lines to turn on the switching devices after a second window corresponding to an X-ray radiation time; and
during the X-ray read out, reading electrical signals output by the switching devices.

5. The method of claim 4, further comprising obtaining the X-ray image based on the electrical signals read during the X-ray read out.

6. The method of claim 4, further comprising initializing electrical signals of the light sensing pixels during a signal initialization between the offset read out and the X-ray read out.

7. The method of claim 1, further comprising:
performing a number of scan operations to obtain the X-ray image,
wherein the number of scan operation is different from the predetermined number of scan operations in (a).

8. The method of claim 1, wherein:
each scan operation is performed for a first duration, and
a period of time between consecutive scan operations is a second duration different from the first duration.

9. The method of claim 8, wherein second duration is substantially zero.

10. An X-ray detector comprising:
a plurality of light sensing pixels, each pixel comprising a photo diode for sensing X-rays and outputting an electrical signal corresponding to an amount of the sensed X-rays and a switching device to transmit the electrical signal;
a gate driver to perform a scan operation a predetermined number of times in respective frames before an X-ray image is obtained, each scan operation including outputting for each pixel, a first gate signal to a gate line to turn on the switching device during an offset adjustment and to output a second gate signal to the gate line to turn on the switching device during an offset read out after a first window time;
a read out integrated circuit to detect for each pixel, an electrical signal output by the switching device during the offset read out for the respective frames; and
a signal processor to obtain a first offset image based on the electrical signals read out for a first frame, a second offset image based on electrical signals read out for a second frame, and a third offset image based on the first offset image and the second offset image, wherein the signal processor subtracts the third offset image from the X-ray image to generate a corrected X-ray image detected after the second frame based on the third offset image.

11. The X-ray detector of claim 10, wherein the read out integrated circuit detects an electrical signal discharged from a data line during the offset adjustment.

12. The X-ray detector of claim 10, wherein the signal processor obtains the third offset image by averaging the first and second offset images.

13. The X-ray detector of claim 10, wherein the gate driver outputs a fourth gate signal to the gate line to turn on the switching device after a second window time corresponding to an X-ray radiation time, during an X-ray read out, and wherein the read out integrated circuit detects an electrical signal output by the switching device during the X-ray read out.

14. The X-ray detector of claim 13, wherein the signal processor obtains an X-ray image based on electrical signals read out during the X-ray read out.

15. The X-ray detector of claim 14, wherein the signal processor subtracts the third offset image from the X-ray image to obtain a corrected X-ray image.

16. The X-ray detector of claim 13, wherein the read out integrated circuit initializes an electrical signal of the light sensing pixel during a signal initialization between the offset read out and the X-ray read out.

* * * * *